United States Patent
Kroner et al.

(10) Patent No.: US 6,756,471 B1
(45) Date of Patent: Jun. 29, 2004

(54) PROCESS FOR THE PREPARATION OF WATER-SOLUBLE POLYMERS CONTAINING POLYALKYLENE GLYCOL ETHER SIDE CHAINS

(75) Inventors: Matthias Kroner, Eisenberg (DE); Karl-Heinz Büchner, Altlussheim (DE); Johannes Perner, Neustadt (DE)

(73) Assignee: BASF Aktiegesellschaft, Ludwigshafen (DE)

(*) Notice: Subject to any disclaimer, the term of this patent is extended or adjusted under 35 U.S.C. 154(b) by 29 days.

(21) Appl. No.: 10/129,110

(22) PCT Filed: Nov. 21, 2000

(86) PCT No.: PCT/EP00/11579

§ 371 (c)(1),
(2), (4) Date: May 13, 2002

(87) PCT Pub. No.: WO01/40338

PCT Pub. Date: Jun. 7, 2001

(30) Foreign Application Priority Data

Dec. 3, 1999 (DE) .......................... 199 58 447

(51) Int. Cl.⁷ .............................................. C08G 63/00
(52) U.S. Cl. ....................... 528/271; 528/365; 562/512; 562/352; 562/317.1; 526/72
(58) Field of Search ................................. 560/129, 190, 560/205, 231

(56) References Cited

U.S. PATENT DOCUMENTS 5,712,359 A    1/1998  Auschra et al.
6,384,111 B1 * 5/2002  Kistenmacher et al. ........ 524/5

FOREIGN PATENT DOCUMENTS

DE  19653524    * 6/1998
EP  0 353 844     2/1990
EP  0 567 214    10/1993
EP  0 753 488     1/1997

* cited by examiner

Primary Examiner—Karl J. Puttlitz
(74) Attorney, Agent, or Firm—Oblon, Spivak, McClelland, Maier & Neustadt, P. C.

(57) ABSTRACT

The invention relates to a process for the preparation of water-soluble polymers containing polyalkylene glycol ether side chains and having molecular weights of from 15,000 to 65,000 by solution polymerization of esters of ethylenically unsaturated carboxylic acids and polyalkylene glycols which are masked on the end groups at one end, if desired together with another monomer in at least one hydrocarbon at monomer concentrations of from 70 to 95% by weight in the presence of free-radical-forming polymerization initiators and, if desired, polymerization regulators at temperatures of up to 200° C., removal of the solvent used in the solution polymerization, and dissolution of the polymers in water to give from 50 to 80% strength by weight solutions, with polymers containing acid groups being neutralized if desired.

19 Claims, No Drawings

PROCESS FOR THE PREPARATION OF WATER-SOLUBLE POLYMERS CONTAINING POLYALKYLENE GLYCOL ETHER SIDE CHAINS

The present invention relates to a process for the preparation of water-soluble polymers containing polyalkylene glycol ether side chains and having molecular weights of from 15,000 to 60,000 by solution polymerization of esters of ethylenically unsaturated carboxylic acids and polyalkylene glycols which are masked on the end groups at one end, if desired together with other monomers in at least one hydrocarbon in the presence of free-radical-forming polymerization initiators and, if desired, polymerization regulators at temperatures of up to 200° C., removal of the solvent after the polymerization, and dissolution of the polymers in water to give from 50 to 80% strength by weight solutions, with polymers containing acid groups being neutralized if desired.

DE-A-19 653 524 describes the preparation of copolymers of methylpolyethylene glycol methacrylates and methacrylic acid by polymerization in aqueous medium using water-soluble initiators and water-soluble regulators. The concentrations in the polymerization are about 20% by weight. If the solids concentration in the polymer is increased, polymers having very high polydispersity and a high proportion of high-molecular-weight polymers are formed. Such products are ineffective as dispersants.

Esters of ethylenically unsaturated carboxylic acids and polyalkylene glycols which are masked on the end groups at one end may also be prepared by bulk polymerization or by solution polymerization in an aliphatic or aromatic hydrocarbon, cf. EP-A-753 488. However, polymerization in an aqueous medium, which gives about 25% strength by weight aqueous polymer solutions, is preferred since particularly effective dispersants containing polyalkylene glycol ether side chains are obtained. If the polymerization of the esters of ethylenically unsaturated carboxylic acids and polyalkylene glycols which are masked on the end groups at one end is carried out at high concentration, for example at concentrations of greater than 50% by weight, products which have only low efficacy as dispersants are obtained.

It is an object of the present invention to provide a process for the preparation of highly concentrated, but still readily flowable aqueous solutions of water-soluble polymers which contain polyalkylene glycol ether side chains and which are effective as dispersants for finely divided inorganic substances.

We have found that this object is achieved by a process for the preparation of water-soluble polymers containing polyalkylene glycol ether side chains and having molecular weights of from 15,000 to 65,000 by solution polymerization of esters of ethylenically unsaturated carboxylic acids and polyalkylene glycols which are masked on the end groups at one end, if desired together with other monomers in at least one hydrocarbon in the presence of free-radical-forming polymerization initiators and, if desired, polymerization regulators at temperatures of up to 200° C., removal of the solvent after the polymerization, and dissolution of the polymers in water to give from 50 to 80% strength by weight solutions, with polymers containing acid groups being neutralized if desired, if the concentration of the monomers in the hydrocarbons is from 70 to 95% by weight. The polymerization is preferably carried out at a concentration of the monomers of from 80 to 90% by weight.

Preferably,
(a) esters of the formula

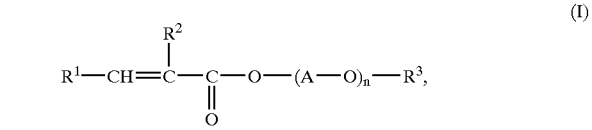

in which
R$^1$ and R$^2$ are identical or different and are H or CH$_3$,
A is an alkylene group having from 2 to 4 carbon atoms or is —CH$_2$—CH$_2$—CH$_2$—CH$_2$—,
is C$_1$- to C$_{50}$-alkyl or C$_1$- to C$_{18}$-alkylphenyl, and
is a number from 2 to 300,
are copolymerized with
(b) at least one monoethylenically unsaturated carboxylic acid or salts thereof. The monomers (a) and (b) are usually copolymerized in a weight ratio of from 98:2 to 2:98.

Particular preference is given to the copolymerization of
(a) acrylic acid esters or methacrylic acid esters of polyalkylene glycols which are masked on the end groups at one end by C1- to C4-alkyl and have molecular weights of from 200 to 10,000
with
(b) acrylic acid and/or methacrylic acid.

Particularly effective dispersants are obtained if
(a) esters of methacrylic acid and methylpolyethylene glycol having molecular weights of from 350 to 10,000
are copolymerized with
(b) methacrylic acid.

According to a preferred embodiment of the process according to the invention, the copolymerization is carried out in the presence of from 0.1 to 10% by weight of a polymerization regulator. Examples of suitable polymerization regulators are sodium hydrogensulfite, sodium bisulfite, sodium thiosulfate, sodium hypophosphite, phosphorous acid, 2-mercaptoethanol, dodecyl mercaptan, mercaptopropionic acid, mercaptoacetic acid, alkali metal salts of the said acids or mixtures of the polymerization regulators.

The alkylpolyalkylene glycols used can be, for example, compounds of the general formulae

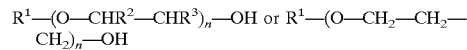

where
R$^1$=C$_1$- to C$_{50}$-alkyl
R$^2$ and R$^3$=H, methyl or ethyl,
n=from 2 to 300.

The molecular weight of the alkylpolyalkylene glycols can be up to 10,000, with a molecular weight of from 200 to 2000 being preferred. This corresponds to up to 230, preferably from 3 to 40, alkylene oxide units per molecule. Examples of alkylpolyalkylene glycols are methylpolyethylene glycols having molecular weights of 350, 500, 750, 1000, 1500, 2000, 4000 and 10,000.

The alkylpolyalkylene glycols may also contain propylene oxide or butylene oxide units in combination with ethylene oxide units. The alkylene oxide units may be arranged in block form or randomly.

Examples thereof are methylpolyalkylene glycols which are obtainable by adduction of 5 mol of ethylene oxide and 1 mol of propylene oxide, 5 mol of ethylene oxide and 3 mol of propylene oxide, 5 mol of ethylene oxide and 10 mol of propylene oxide and 10 mol of ethylene oxide and 1 mol of propylene oxide, 10 mol of ethylene oxide and 3 mol of propylene oxide, 10 mol of ethylene oxide and 10 mol of propylene oxide, 20 mol of ethylene oxide and 1 mol of propylene oxide, 20 mol of ethylene oxide and 3 mol of propylene oxide, 20 mol of ethylene oxide and 10 mol of propylene oxide, 25 mol of ethylene oxide and 1 mol of propylene oxide, 25 mol of ethylene oxide and 3 mol of propylene oxide and 25 mol of ethylene oxide and 10 mol of propylene oxide ontoin each case 1 mol of methanol.

The polyalkylene glycols which are masked on the end groups at one end may also be polytetrahydrofurans having molecular weights of, for example, from 200 to 10,000 which carry a $C_1$- to $C_4$-alkyl group as end group.

The unsaturated carboxylic acids employed are preferably acrylic acid, methacrylic acid, maleic acid and maleic anhydride.

Esters of alkylpolyalkylene glycols and unsaturated carboxylic acids can be prepared, for example, by acid-catalyzed esterification of unsaturated carboxylic acids with alkylpolyalkylene glycols by all known processes. The water of reaction can remain in the mixture or be removed from the reaction mixture by, for example, azeotropic distillation using an entraining agent. Thus, the conversion of the alcohol component can be up to 100%, cf. EP-A-0 884 290.

In the esterification, the molar ratio of carboxylic acid to alkylpolyalkylene glycol can be, for example, from 10:1 up to 1:1.

Suitable entraining agents are all organic solvents having a boiling point of from 50 to 300° C. The proportion of entraining agent is, for example, from 5 to 20% by weight, based on the sum of the carboxylic acid and alcohol components. Examples of entraining agents are n-paraffins, such as hexane, decane, undecane, dodecane, octadecane, isoparaffins, such as isooctane, isononane, isodecane, isododecane, isohexadecane, isooctadecane, cycloparaffins, such as cyclohexane, methylcyclohexane, dimethylcyclohexane, aromatics, such as benzene, toluene, o-, m- and p-xylene, xylene mixtures, trimethylbenzene, tetramethylbenzene, mesitylene, ethylbenzene, isopropylbenzene, n-butylbenzene and isobutylbenzene. Preference is given to cyclohexane, toluene, xylene mixtures and o-xylene. Particular preference is given to cyclohexane, methylcyclohexane, toluene and xylene.

It is also possible to use technical-grade mixtures of different entraining agents. Such mixtures often result in a boiling range. Such mixtures are also known as special boiling-point gasoline, petroleum spirit, special boiling-point spirit, naphtha or petroleum ether fractions. Such mixtures often arise as refinery fractions. They can be produced specifically from steam-cracker olefins by oligomerizations and hydrogenations.

Examples of special boiling-point gasolines of this type are gasolines having boiling ranges of from 90° C. to 100° C., from 100° C. to 140° C. or from 140° C. to 160° C. They are usually mixtures of alkanes. Fractions may comprise purely n-aliphatic, isoaliphatic, aliphatic-aromatic or purely aromatic constituents, depending on the origin.

Suitable entraining agents are all hydrocarbons or hydrocarbon mixtures. An overview of the hydrocarbon mixtures available industrially is given, for example, in Kirk-Othmer, Encyclopedia of Chemical Technology, 1995, Vol. 13, pages 744 ff., Hydrocarbons chapter or ebenda Vol. 12, pages 126 ff., Fuels chapter and Vol. 12, pages 341 ff., Gasoline chapter. A further overview of hydrocarbon mixtures is given in ullmann's Encyclopedia of Industrial Chemistry, 1989 Vol. A 13, pages 227–281 in the Hydrocarbons chapter, as well as ebenda in Vol. A 16, pages 719–755 in the Motor Fuels chapter.

The entraining agents form, together with water, an azeotropic mixture, which generally has a boiling point below that of the low-boiling constituent. The boiling points of the azeotropic mixtures are, for example, particularly preferably from 70° C. to 130° C.

The esters can also be prepared by alkali-catalyzed transesterification of unsaturated carboxylic acid esters with alkylpolyalkylene glycols, cf. WO-A-97/26293.

Alkylene glycol monomethacrylates or monoacrylates can also be prepared, for example, as described in WO-A-99/10407 by alkoxylation of acrylic acid, methacrylic acid, hydroxyethyl acrylate, hydroxyethyl methacrylate, hydroxypropyl methacrylate or hydroxypropyl acrylate by means of complex-bound cyanides as catalysts.

The initiators used for the polymerization are initiators which are soluble in the polymerization medium. Examples are organic peroxides and azo initiators, for example diacyl peroxides, peroxydicarbonates, dialkyl peroxides, peroxyesters, diperoxyesters, peroxyketals, hydroperoxides, 1,2-diphenylalkanes and hydrogen peroxide. It is also possible to use water-soluble initiators. Examples are sodium peroxodisulfate, potassium peroxodisulfate and ammonium peroxodisulfate. They are employed in the form of an aqueous solution. The proportion of water, based on the reaction mixture, should not be greater than 20% by weight. The water content is preferably less than 10% by weight.

The polymerization according to the invention is carried out as a solution polymerization in at least one hydrocarbon. Examples of hydrocarbons are all the abovementioned entraining agents. The entraining agent employed in the esterification is preferably used as solvent in the solution polymerization. Preferred solvents for the solution polymerization are toluene, xylene, cyclohexanone, methylcyclohexene and mixtures of aliphatic hydrocarbons having boiling points of from 70 to 160° C. under atmospheric pressure.

The process according to the invention is preferably carried out by metering a mixture of alkylpolyalkylene glycol esters and ethylenically unsaturated carboxylic acids and at the same time initiators and regulators at from 60 to 200° C., preferably at from 70 to 150° C., over the course of from 1 to 20 hours into a reactor in which the polymerization takes place. The reactor is usually rendered inert using nitrogen. When the metered addition is complete, the mixture is polymerized for a further 1 to 5 hours. Volatile components are then removed by distillation, and the polymer is diluted with water to the use concentration. However, it is also possible firstly to add the requisite amount of water in order to prepare from 50 to 80% strength by weight aqueous polymer solutions, and then to remove the solvent used in the polymerization from the mixture by azeotropic distillation. It is likewise possible firstly to remove only some of the solvent employed in the solution polymerization by distillation after the polymerization, then to add water and to remove the remainder of the solvent by azeotropic distillation.

In accordance with the process according to the invention, it is possible to prepare polymers having a molecular weight in the range from 15,000 to 65,000 in the form of 70 to 95% strength by weight solutions in hydrocarbons. This is advantageous in industry in order to achieve a high space-time yield of reactors.

The proportion of organic solvents can be up to 30% by weight during the polymerization. The at least 80% strength by weight polymer solutions are readily flowable and stirrable at temperatures above 60° C. Since they have a high viscosity at below 50° C., they are diluted to the use concentration with water, with the organic solvents being removed from the mixture by distillation before, during or after the addition of water. The solutions obtainable in this way can then readily be handled at ambient temperature. The service concentration of the aqueous solution is preferably from 50 to 80% by weight. The aqueous 50 to 80% by weight polymer solutions are readily flowable, pourable and pumpable. The viscosities are from 500 mPas to 10,000 mPas. A further advantage over the prior art is that the polymer solutions are free from foreign ions, for example contain no sodium sulfate. The molecular weight $M_w$ of the polymers is from 15,000 to 65,000, preferably from 20,000 to 40,000. The free acid groups of the polymers are, if desired, neutralized using bases, preferably using aqueous sodium hydroxide solution.

The percentages in the examples are % by weight. The K value of the polymers was determined by the method of H. Fikentscher, Cellulose-chemie, Vol. 13, 58–64 and 71–74 (1932), in aqueous solution at a pH of 7, a temperature of 25° C. and a polymer concentration of the sodium salt of the copolymers of 1% by weight.

EXAMPLES

Preparation of the Esters

Ester 1

2020 g of methylpolyethylene glycol having a molecular weight of 1000, 0.3 g of phenothiazine, 711 g of methacrylic acid, 140 g of toluene and 67 g of p-toluenesulfonic acid were heated at 120° C. for 4 hours in a reactor with a capacity of 4 liters fitted with metering devices while nitrogen was passed through the reactor, and the water was separated off in a water separator. The acid number of the mixture was 125 mg of KOH/g. The degree of esterification was 95%.

Ester 2

2020 g of methylpolyethylene glycol having a molecular weight of 1000, 0.3 g of phenothiazine, 711 g of methacrylic acid, 25 g of p-toluenesulfonic acid and 500 g of toluene were refluxed for 10 hours at 130° C. in a reactor having a capacity of 4 liters fitted with metering devices while nitrogen was passed through the reactor. The azeotrope was condensed and separated in a water separator. The toluene was fed back into the reactor from the water separator, while the water was removed from the system. After the esterification, the toluene remained in the reaction mixture. The acid number of the mixture after the esterification was 109 mg of KOH/g. The reaction mixture contained 1% of methylpolyethylene glycol.

Example 1

900 g of ester 1 and at the same time 16 g of 50% strength by weight aqueous hypophosphorous acid and 43 g of tert-butyl peroctanoate were metered into a reactor with a capacity of 2 liters at 100° C. over the course of 4 hours with constant stirring. When the polymerization was complete, the toluene was removed by distillation, the reaction mixture was subsequently cooled, the polymer melt was diluted to a solids content of 60% by weight with water and adjusted to a pH of 6.7 by addition of 50% strength by weight aqueous sodium hydroxide solution. The viscosity of the ready-to-use polymer sol was about 1300 mPas at 23° C. The molecular weight (weight average) of the copolymer was 49,000. The copolymer had a K value of 41.

Examples 2 to 4

Polymerizations of ester 1 were carried out analogously to example 1 as shown in the following table. Ready-to-use, 60% strength by weight aqueous polymer solutions were prepared by dilution of the polymer melts with water.

TABLE 1

|  | 50% strength aqueous hypophosphorous acid | Tert-butyl peroctanoate [g] | MW of the copolymer | K value |
| --- | --- | --- | --- | --- |
| Example 4 | 32 g | 43 | 44,000 | 38 |
| Example 5 | 32 g | 21 | 64,000 | 43 |
| Example 6 | 48 g | 43 | 29,000 | 32 |

Example 5

900 g of ester 2 and at the same time 48 g of 50% strength by weight aqueous hypophosphorous acid and 43 g of tert-butyl peroctanoate were metered into a reactor with a capacity of 2 liters at 100° C. over the course of 4 hours. When the polymerization was complete, the toluene was removed by distillation at 100° C. under a water-pump vacuum, the polymer was diluted to a solids content of 60% by weight with water and adjusted to a pH of 6.7 by addition of 50% strength by weight aqueous sodium hydroxide solution. The viscosity of the aqueous polymer solution was 1275 mPas at 24° C. The copolymer had a molecular weight (weight average) of 22,000 and a K value of 26.

Examples 6 to 10

Analogously to example 1, but additionally in the presence of the regulators indicated in table 2, polymerizations of ester 1 were carried out in each case as described in the following table. By dilution of the polymer melts with water and neutralization using 50% strength by weight aqueous sodium hydroxide solution, ready-to-use 60% strength by weight polymer solutions were prepared.

TABLE 2

|  | Regulator | Tert-butyl peroctanoate | Mw | K value |
| --- | --- | --- | --- | --- |
| Example 6 | 50 g of 50% strength aqueous hypophosphorous acid | 43 g | 34,000 | 32 |
| Example 7 | 32 g of mercaptoethanol | 21 g | 24,000 | 25 |
| Example 8 | 48 g of mercaptopropionic acid | 43 g | 29,000 | 32 |
| Example 9 | 30 g of dodecyl mercaptan | 35 g | 20,000 | 25 |
| Example 10 | 40 g of trimethyl phosphite | 25 g | 31,000 | 33 |

The ready-to-use polymer solutions are suitable as dispersants, in particular as plasticizers for concrete.

We claim:

1. A process for the preparation of water-soluble polymers containing polyalkylene glycol ether side chains and having molecular weights of from 15,000 to 65,000, comprising polymerizing in solution a monomer or a mixture of monomers comprising at least one ester of an ethylenically unsaturated carboxylic acid and a polyalkylene glycol wherein the ester is masked on the end groups at one end, in at least one hydrocarbon in the presence of one or more free-radical-forming polymerization initiators to form a polymer or a copolymer, removing the hydrocarbon at temperatures of up to 200° C., and dissolving the polymer or copolymer in water to give a from 50 to 80% strength by weight solution of the polymer or copolymer in water wherein the concentration of the monomer or the monomer mixture in the hydrocarbon is from 70 to 95% by weight.

2. The process as claimed in claim 1, wherein the concentration of the monomer or the monomer mixture in the hydrocarbon is from 80 to 90% by weight.

3. The process as claimed in claim 1, wherein (a) one or more esters of formula $$R^1—CH=C(R^2)—C(=O)—O—(A—O)_n—R^3, \quad (I)$$

in which $R^1$ and $R^2$ are identical or different and are H or $CH_3$,

A is an alkylene group having from 2 to 4 carbon atoms or is $CH_2CH_2CH_2CH_2$, $R^3$ is $C_1$ to $C_{50}$ alkyl or $C_1$ to $C_{18}$ alkylphenyl, and n is a number from 2 to 300, are copolymerized with, (b) at least one monoethylenically unsaturated carboxylic acid or salts thereof.

4. The process as claimed in claim 3, wherein (a) and (b) are copolymerized in a weight ratio of from 98:2 to 2:98.

5. The process as claimed in claim 1, wherein (a) one or more acrylic acid esters or methacrylic acid esters of polyalkylene glycols which are masked on the end groups at one end by C1 to C4 alkyl and have molecular weights of from 200 to 10,000 are copolymerized with (b) acrylic acid, methacrylic acid or both acrylic acid and methacrylic acid.

6. The process as claimed in claim 1, wherein (a) one or more esters of methacrylic acid and methylpolyethylene glycol having molecular weights of from 350 to 10,000 are copolymerized with (b) methacrylic acid.

7. The process as claimed in claim 1, wherein the polymerizing is carried out in the presence of from 0.1 to 10% by weight of a polymerization regulator.

8. The process as claimed in claim 7, wherein the polymerization regulator is at least one selected from the group consisting of sodium hydrogensulfite, sodium bisulfite, sodium thiosulfate, sodium hypophosphite, phosphorous acid, mercaptoethanol, dodecyl mercaptan, mercaptopropionic acid, mercaptoacetic acid, and alkali metal salts thereof.

9. The process as claimed in claim 1, further comprising:

neutralizing at least some of the acid groups in the polymer or copolymer with one or more bases.

10. The process as claimed in claim 1, wherein the ester is derived from at least one polyalkylene glycol of the following formula:

$$R^1—(O—CHR^2—CHR^3)_n—OH \text{ or } R^1—(O—CH_2—CH_2—CH_2—CH_2)_n—OH$$

where $R^1$ is $C_1$ to $C_{50}$-alkyl, $R^2$ and $R^3$ are independently H, methyl or ethyl, and n is from 2 to 300.

11. The process as claimed in claim 1, wherein the ester has a molecular weight of from 200 to 2,000.

12. The process as claimed in claim 1, wherein the ester is derived from methylpolyethylene glycol.

13. The process as claimed in claim 1, wherein the ester is derived from a polykylene glycol comprising polymerized units of propylene oxide, butylene oxide, or both propylene oxide and butylene oxide, and ethylene oxide.

14. The process as claimed in claim 1, wherein the ester is derived from at least one ethylenically unsaturated carboxylic acid selected from the group consisting of acrylic acid, methacrylic acid, maleic acid and maleic anhydride.

15. The process as claimed in claim 1, wherein the hydrocarbon is at least one selected from the group consisting of toluene, xylene, cyclohexanone, methylcyclohexanone and mixtures of aliphatic hydrocarbons having boiling points of from 70 to 160° C. at atmospheric pressure.

16. The process as claimed in claim 1, further comprising adding an aqueous solution to the polymerized mixture before removing the hydrocarbons.

17. A 50% to 80% strength by weight aqueous solution of water-soluble polymers containing polyalkylene glycol ether side chains and having molecular weights of from 15,000 to 65,000 obtained by the process as claimed in claim 1.

18. The process as claimed in claim 1, wherein the monomer mixture further comprises one or more ethylenically unsaturated monomers.

19. The process as claimed in claim 1, further comprising reacting an ethylenically unsaturated carboxylic acid with a polyalkylene glycol to form the ester.

* * * * *